(12) United States Patent
Yang (10) Patent No.: US 10,446,904 B2
(45) Date of Patent: Oct. 15, 2019

(54) NEW-TYPE FLAT PANEL TV ANTENNA AND METHOD FOR INSTALLATION THEREOF

(71) Applicant: SHENZHEN ANTOP TECHNOLOGY LIMITED, Bao'An District, Shenzhen (CN)

(72) Inventor: Ruidian Yang, Shenzhen (CN)

(73) Assignee: Shenzhen Antop Technology Limited, Shenzhen (CN)

( * ) Notice: Subject to any disclaimer, the term of this patent is extended or adjusted under 35 U.S.C. 154(b) by 125 days.

(21) Appl. No.: 15/853,316

(22) Filed: Dec. 22, 2017

(65) Prior Publication Data

US 2019/0058238 A1 Feb. 21, 2019

(30) Foreign Application Priority Data

Aug. 21, 2017 (CN) .......................... 2017 1 0719807
Aug. 21, 2017 (CN) ...................... 2017 2 1047410 U
Aug. 24, 2017 (CN) .......................... 2017 1 0735696
Aug. 24, 2017 (CN) ...................... 2017 2 1067927 U (51) Int. Cl.
*H01Q 1/12* (2006.01)
*H01Q 1/22* (2006.01)
*F16M 13/02* (2006.01)

(52) U.S. Cl.
CPC .......... *H01Q 1/1207* (2013.01); *H01Q 1/125* (2013.01); *H01Q 1/1221* (2013.01); *H01Q 1/22* (2013.01); *F16M 13/02* (2013.01)

(58) Field of Classification Search
CPC ................................... H01Q 1/12; H01Q 1/22

USPC .......................................................... 343/892
See application file for complete search history.

(56) References Cited

U.S. PATENT DOCUMENTS

2004/0027307 A1* 2/2004 Hossein ............... H01Q 1/1242
343/890

* cited by examiner

*Primary Examiner* — Andrea Lindgren Baltzell
(74) *Attorney, Agent, or Firm* — Muncy, Geissler, Olds & Lowe, P.C.

(57) ABSTRACT

The present invention in particular relates to a new-type antenna for a flat panel display TV, comprising a long strip shaped main body, wherein a front edge of the main body is provided with a front support part to be hung on a front edge of a top part of the flat panel display TV, a lower side of the main body is provided with a slide locking mechanism and a rear support part to be supported on a back side of the flat panel display TV, the rear support part is installed and can be adjusted forwards and backwards on the main body through the slide locking mechanism. The present invention allows the antenna main body to be installed on the top part of the flat panel display TV through the arrangement of the front support part and rear support part. Therefore, the antenna may avoid the interference from the flat panel display TV, it's possible to guarantee the signal received quality of the planar antenna, make full use of the available space on the top part of the flat panel display TV, reduce the space occupied by the general placement of antenna, and meanwhile keep harmonious and beautiful during use. In addition, the rear support part locked on the main body and capable of sliding forwards and backwards makes the present patent to have better adaptability and suitable for flat panel display TVs with various width specifications.

17 Claims, 8 Drawing Sheets

NEW-TYPE FLAT PANEL TV ANTENNA AND METHOD FOR INSTALLATION THEREOF

FIELD OF THE INVENTION

The invention relates to the field of TV antennas, in particular, to a new-type flat panel TV antenna and method for installation thereof.

BACKGROUND

With the widespread use of the flat panel TV, the antenna applicable to the flat panel TV is also developing accordingly. Existing flat panel TV antennas are mainly divided into two ways: outdoor antennas and indoor antennas. The indoor antennas applicable to the flat panel TV are mainly planar antennas. The planar antenna is usually in the form of plate and long strip. The planar antenna with plate shape is small in size and may be placed anywhere, such as beside or on the TV set, but has small signal receiving area and poor signal reception. As a result, it may be necessary to adjust the angle of the planar antenna to achieve the optimal signal reception, which leading to an increase in the complexity of the installation structure. While the planar antenna with long strip shape strip has good signal reception, but large in size and occupying large space, which resulting that the location of its replacement is not flexible enough. Generally, the planar antenna with long strip shape is mainly hung above the flat panel TV set through bolts, or placed underneath the flat panel TV set through a support. Because it's necessary to drill holes on the wall by the means of hanging, the plana antenna is inconvenient to be installed and this way will be not applicable if there is no background wall or the background wall is not suitable for hole drilling. For the manner of placing the planar antenna underneath the flat panel TV set through a support, because of the influence of the radiation of the flat panel TV, the signal reception of the planar antenna is poor. Moreover, large space is occupied in this way. Thus, it's inconvenient to use.

Therefore, how to install the long strip shaped planar antenna to an appropriate position it is an urgent technical problem to be solved at present, which can not only guarantee the quality of signal reception and save space, but also preferably keeps harmonious with the appearance of the flat panel TV set and meet all kinds of flat panel TV with various specifications.

SUMMARY

In order to overcome the defects of the prior arts, the present invention provides a new-type flat panel TV antenna and method for installation thereof, which may achieve objectives of adapting to flat panel TV sets with various specifications, guaranteeing the signal reception quality of the planar antenna, saving space and being harmonious with the appearance of the flat panel TV set.

In view of the above mentioned technical problems, the present invention is implemented by the following technical scheme.

A new-type flat panel TV antenna includes a long strip shaped main body, wherein a front support part hung on the front edge of the top part of the flat panel TV is provided on the front edge of the main body; a slide locking mechanism and a rear support part supported on the back side of the flat panel TV are provided on the lower side of the main body. The rear support part is mounted on the main body and can be adjusted forwards and backwards through the slide locking mechanism. The invention makes it possible to fix the antenna main body on the top part of the flat panel TV through the front support part and rear support part, which protects the antenna from interference of the flat panel TV and makes full use of the available space on the top part of the flat panel TV so as to ensure the signal reception quality of the planar antenna and save the effective space occupied by the general placement of the antenna. Since the planar antenna is relatively light in weight, generally between 100 g and 300 g, the front support part and the rear support part do not need to be designed too large in size so that the antenna can be installed to the flat panel TV harmoniously and beautifully. In addition, the rear support part locked on the main body and capable of sliding forwards and backwards makes the present invention with a better adaptability and suitable for flat panel TVs with various width specifications.

Furthermore, the aforesaid rear support part includes a rear support plate and a sliding fixed plate, which are jointed at a certain angle. The sliding fixed plate is provided with a first sliding groove extending forwards and backwards in which the slide locking mechanism used for adjusting the sliding fixed plate forwards and backwards is equipped. At least one side of the first sliding groove is provided with a sawtooth. The slide locking mechanism is mounted on the lower side of the main body, and a V-shaped leaf spring leaf spring or a pawl engaged with the cogging of the sawtooth is clamped on the slide locking mechanism.

When the sliding fixed plate is pulled, the bottom end of the V-shaped leaf spring will be successively embedded into different sawtooth indentations by the elasticity of the leaf spring, thereby the position of the sliding fixed plate can be adjusted forwards and backwards. Alternatively, the position of the sliding fixed plate can also be adjusted forwards and backwards through fixing the pawl to different cogging.

Further, a hanging hole is arranged on the rear support plate.

The above arrangement allows the whole antenna to be hung on a wall or other objects through the hanging hole, so that a user may use the antenna in many scenarios, which enhances the convenience of the use of the antenna.

Further, a rotating mechanism used for folding is arranged at the middle part of the sliding fixed plate, which divides the sliding fixed plate into two sub plates. In order to buckle with each other, the two sub plates are respectively provided with a lock part and a catch part at the position of the rotating mechanism. The slide locking mechanism includes a first bolt passing through the first sliding groove and a first turncap fixed at the bottom end of the first bolt. Correspondingly, a screw hole matched with the first bolt is mounted on the lower side of the main body.

When the rear support plate is at the front end and the sliding fixed plate is at the rear end, since current flat panel TVs are installed close to wall surfaces and the first sliding groove of the sliding fixed plate is required to make the rear support part applicable to flat panel TVs of all kinds of width specifications, i.e. the first sliding groove and the sliding fixed plate are both relatively long resulting that the sliding fixed plate may come into contact with the wall surface owing to protruding from the rear end of the flat panel TV, which impacts the installation of the present invention. Therefore, the rotating mechanism is arranged to divide the sliding fixed plate into two sub plates, wherein one sub plate is used to fix the sliding locking mechanism and the other sub plate may be rotated downwards through the rotating mechanism so as to avoid contacting with the wall surface; when it does not need to rotate the sub plate, the two sub plates may be buckled and fastened together through the lock part and the catch part to avoid the impact on the installation of the present invention. The sliding fixed plate may be adjusted to an appropriate position along the first sliding groove, then by screwing the first turncap the sliding fixed plate may be fixed in the first sliding groove.

Further, a rotating mechanism used for folding is arranged at the middle part of the sliding fixed plate which divides the sliding fixed plate into two sub plates; a guide groove extending forwards and backwards is arranged on the lower side of the main body, in which the two sub plates are clamped for moving forwards and backwards.

For the need of the adjustment of distance between the front support part and the rear support plate, the degree of freedom of the rear support plate and the main body in the adjustment direction must be guaranteed to make the locking mechanism in unlocked condition. In addition to the degree of freedom in the adjustment direction, the rear support plate and the main body also have degrees of freedom in other directions, which is not beneficial for the installation process. In order to reduce the difficulty of installation, the guide groove is arranged on the lower side of the main body, in which the two sub plates are clamped for moving forwards and backwards. In such way, the other five degrees of freedom between the rear support plate and the main body are restricted, which greatly improves the installation efficiency. Furthermore, the guide groove may avoid the situation that the two sub plates rotate around the rotating mechanism so as to eliminate the impact on the installation of the present invention.

Further, the two sub plates are respectively provided with a projection and a recess, which can be buckled with each other, at the joint position.

In order to eliminate the impact on the installation of the present invention, when there is no need to rotate the sub plates, the two sub plates may be fastened together through the buckling between the projection and the recess.

Further, the upper sides of the two sub plates lying against each other at the joint are both in the form of right angles, and the downside of one of the sub plates at the joint is in the form a rounded angle so that any one of the sub plates can be only overturned downwards.

When the rear support plate is at the rear end and the sliding fixed plate is at the front end, the rear support plate will not cause unstable supporting because of upward turn resulting in more stability of the installation.

Further, the rear support part includes a rear support plate and a sliding fixed plate engaged with the sliding locking mechanism, which are jointed at a certain angle. The lower side of the main body is provided with a second sliding groove extending forwards and backwards in which a sliding locking mechanism used for adjusting the sliding fixed plate forwards and backwards is mounted. The sliding locking mechanism includes: a cylindrical clamping part, two sides of which are provided with bayonets lying against the two sides of the second sliding groove; a nut, which is fixed on the upper end of the clamping part; and a second bolt passing through the centers of the cylindrical clamping piece and the nut, of which the bottom end is fixed with a second turncap for rotation. The sliding fixed plate is installed between the second turncap and the main body.

Since the nut is fixed on the upper end of the clamping part and cannot be rotated, the second bolt may be turned upwards through the second turncap so that the sliding fixed plate is tightened under the main body. The second bolt may also be continuously turned downwards through the second turncap so as to loosen the sliding fixed plate, resulting that the cylindrical clamping part may drive, in the sliding groove, the sliding fixed plate to slide frontwards and backwards.

A method for installing the flat panel display TV antenna includes buckling the hanging plate on the front edge of the top part of the flat panel display TV and adjusting, according to a width of the flat panel display TV, the sliding fixed plate to an appropriate position using the slide locking mechanism so that the rear support plate is supported on the back side of the flat panel display TV.

Further, the antenna is installed and used in such a way that the sliding fixed plate is arranged at the rear end and the rear support plate is arranged at the front end, or that the sliding fixed plate is arranged at the front end and the rear support plate is arranged at the rear end.

When the sliding fixed plate is arranged at the front end and the rear support plate is arranged at the rear end, the distance between the rear support plate and the front support part can be adjusted to be much greater, which is suitable for flat panel display TVs with greater width and meanwhile may avoid the situation that the sliding fixed plate protrudes too much to contact with the wall surface. When the sliding fixed plate is arranged at the rear end and the rear support plate is arranged at the front end, the distance between the rear support plate and the front support part may be adjusted to be smaller, which is suitable for flat panel display TVs with smaller width.

Further, when the back side of the flat panel display TV is a plane, the shortest distance between the front support part and the rear support plate is adjusted, using the slide locking mechanism, to be equal to the width of the flat panel display TV; and, when the back side of the flat panel display TV is protruding at a certain angle, the distance between the front support part and the rear support plate is adjusted using the slide locking mechanism until that the rear end of the main body is not higher than the front end of the main body after the installation of the antenna.

When the back side of the flat panel display TV is protruding at a certain angle, if the rear support plate is supported on the protrusion, it is easy to raise the height of the rear end of the main body resulting that the rear end of the main body is higher than the front end of the main body, which destructs the beauty and harmony between the antenna and the flat panel display TV. Moreover, at such time, the front support part at the front edge of the main body may not be able to be buckled on the front edge of the flat panel display TV causing poor reliability. However, the present invention can effectively solve this problem.

Compared with the prior arts, the beneficial effects of the present invention are as follows.

(1) The invention makes it possible to fix the antenna main body on the top part of the flat panel TV through the front support part and rear support part, which protects the antenna from interference of the flat panel TV and makes full use of the available space on the top part of the flat panel TV so as to ensure the signal reception quality of the planar antenna and save the effective space occupied by the general placement of antenna. Since the planar antenna is relatively light in weight, generally between 100 g and 300 g, the front support part and the rear support part do not need to be designed too large in size so that the antenna can be installed to the flat panel TV harmoniously and beautifully resulting in high market competitiveness. In addition, the rear support part locked on the main body and capable of sliding forwards and backwards makes the present invention with better adaptability and suitable for flat panel TVs with various width specifications.

(2) The rotating mechanism divides the sliding fixed plate into two sub plates, wherein one sub plate is used to fix the sliding locking mechanism and the other sub plate may be rotated downwards through the rotating mechanism so as to avoid contacting with the wall surface. When it does not need to rotate the sub plate, the two sub plates may be buckled and fastened together through the lock part and the catch part to avoid the impact on the installation of the present invention.

(3) The slide locking mechanism realizes two effects of adjustment and locking by adopting different structures in different conditions, which is great convenient for users to adjust the sliding fixed plate frontwards and backwards.

(4) The height of the rear support plate, the height of the hanging plate, the angle formed between the hanging plate and the main body, the width of the main body, the length of the main body and other sizes are all designed out to achieve a better effect which also makes the invention more flexible, practical and attractive.

(5) Different installation methods for the flat panel display TV antenna fully indicate that the present invention has great flexibility. In particular, the rear support part may be used reversedly. That is to say, two installation and use methods may be selected: the sliding fixed plate is arranged at the rear end and the rear support plate is arranged at the front end, or the sliding fixed plate is arranged at the front end and the rear support plate is arranged at the rear end. Thus, the applicability of the present invention is greatly enhanced and users may adjust the installation manner according to their requirements.

DESCRIPTION OF THE EMBODIMENTS

The present invention will be discussed in detail as follows in conjunction with the drawings and specific embodiments.

Embodiment 1

Figure 1:
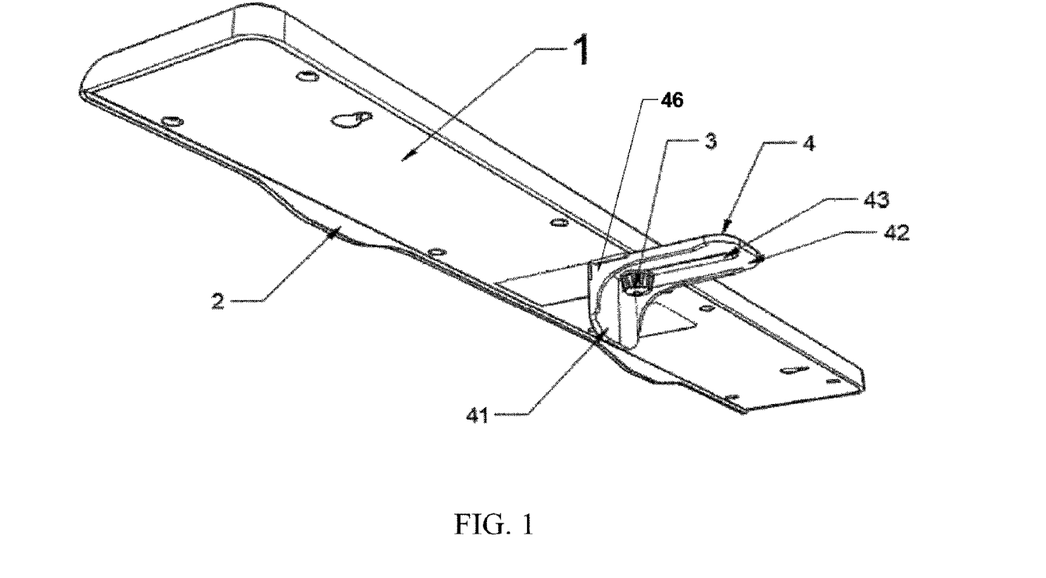
FIG. 1 is a schematic diagram of Embodiment 1 according to the present invention.
Figure 2:
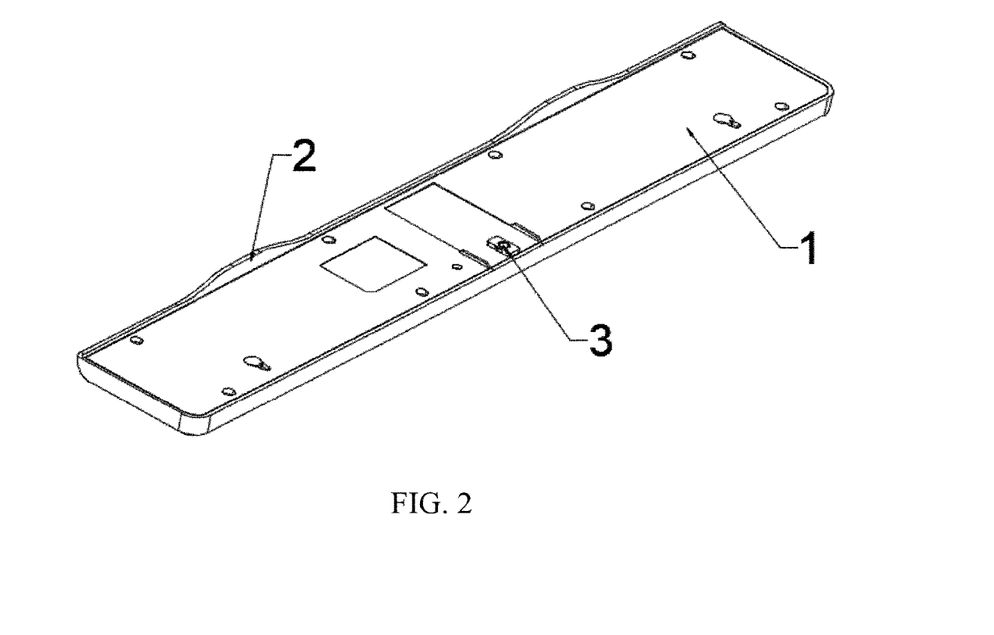
FIG. 2 is a schematic diagram of the lower side of the main body of the Embodiment 1.
Figure 3:
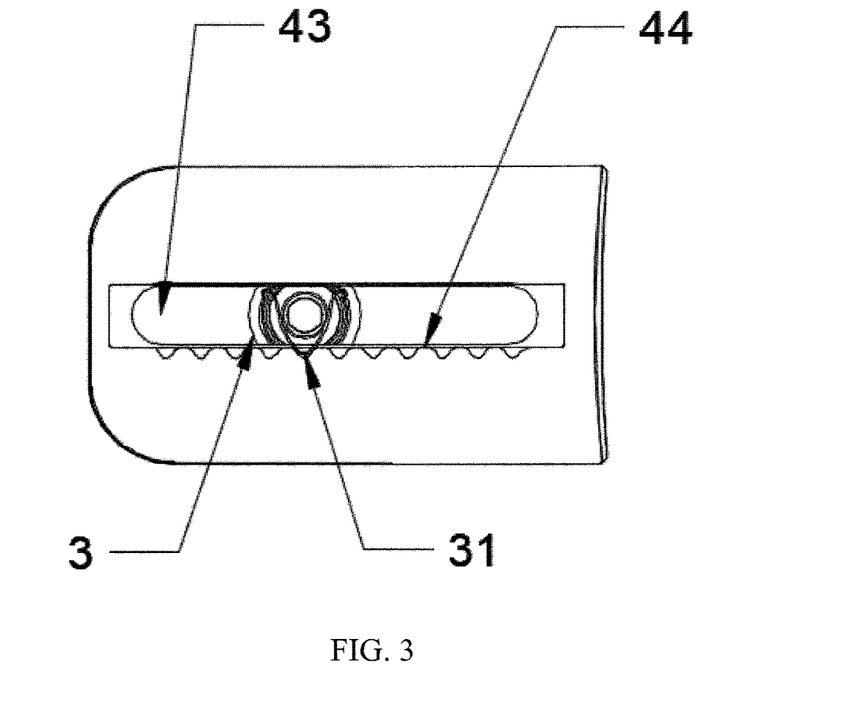
FIG. 3 is a diagram of a fitting state of the slide locking mechanism and the sliding groove of the Embodiment 1.

As shown in FIG. 1 to FIG. 3, a new-type antenna for the flat panel TV includes a long strip shaped main body 1, wherein the front edge of the main body 1 is provided with a front support part 2 to be hung on a front edge of a top part of the flat panel display TV, the lower side of the main body is provided with a sliding locking mechanism 3 and a rear support part 4 to be supported on a back side of the flat panel display TV. The rear support part 4 is installed on the main body 1 through the slide locking mechanism 3 and the rear support part 4 can be adjusted forwards and backwards through the slide locking mechanism 3.

The rear support part 4 includes a rear support plate 41 and a sliding fixed plate 42, which are jointed at a certain angle and between which a ribbed plate 46 used for enhancing structural strength is arranged. A first sliding groove 43 extending forwards and backwards is mounted on the sliding fixed plate 42 and the slide locking mechanism 3 used for adjusting the sliding fixed plate 42 forwards and backwards is installed in the first sliding groove 43. Further, the structure of the ribbed plate 46 is in the form of L of which two legs are connected by means of circular arc transition so as to avoid stress concentration and enhance the strength.

As shown in FIG. 3, one side of the first sliding groove 43 is provided with sawtooth 44 and a V-shaped leaf spring 31 engaged with the cogging of the sawtooth 44 is clamped on the slide locking mechanism 3.

Embodiment 2

Figure 4:
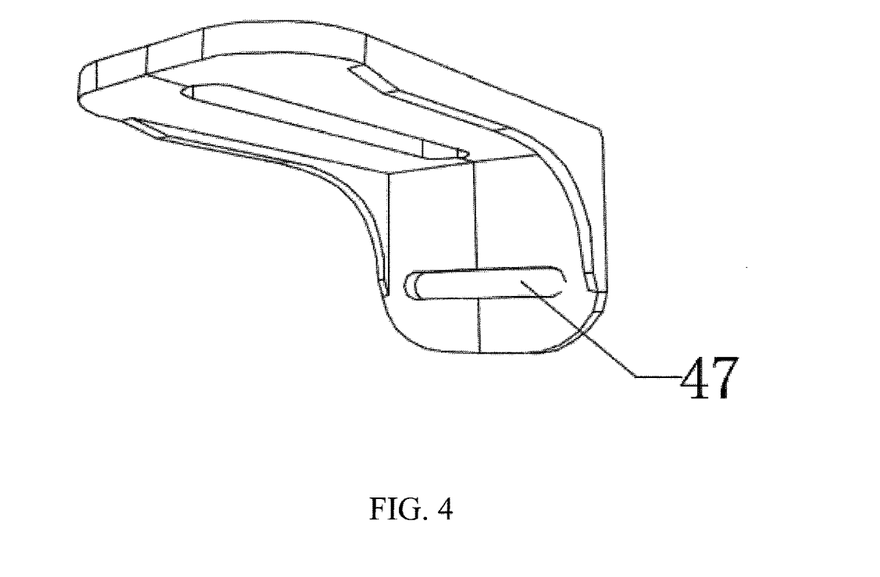
FIG. 4 is a diagram of the rear support plate of the Embodiment 2.

This embodiment differs from the Embodiment 1 in that the rear support plate 41 is provided with a hanging hole 47, as shown in FIG. 4, which makes the antenna to be hung on a wall behind the TV. Therefore, the antenna may be used for the TVs mounted closer to wall surfaces and meanwhile keep the invisibility effect. The advantages of this design are that the adaptability is wide and the user experience is improved.

Embodiment 3

Figure 5:
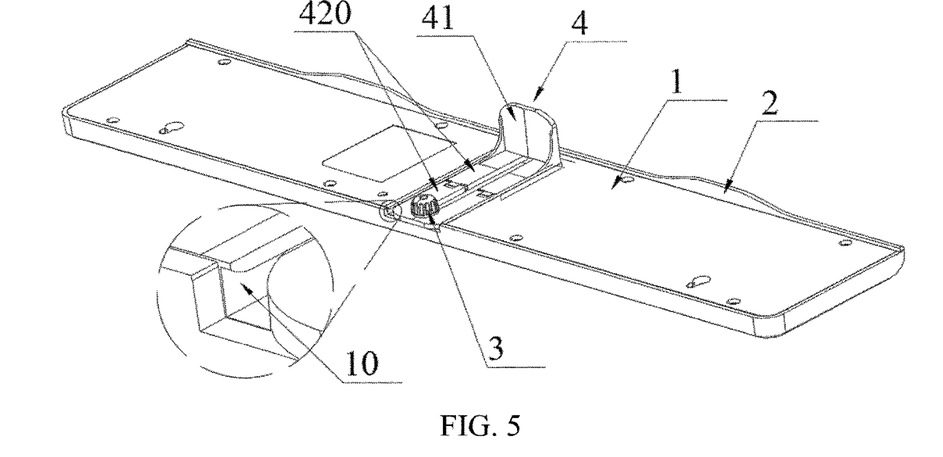
FIG. 5 is a schematic diagram of the Embodiment 3 according to the present invention.
Figure 6:
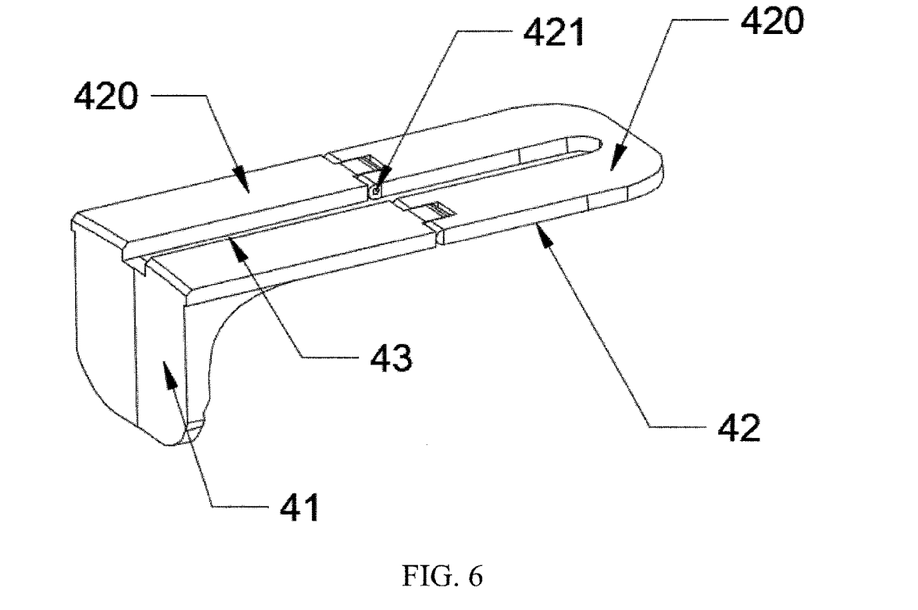
FIG. 6 is a diagram of the rear support part of Embodiment 3 according to the present invention.
Figure 7:
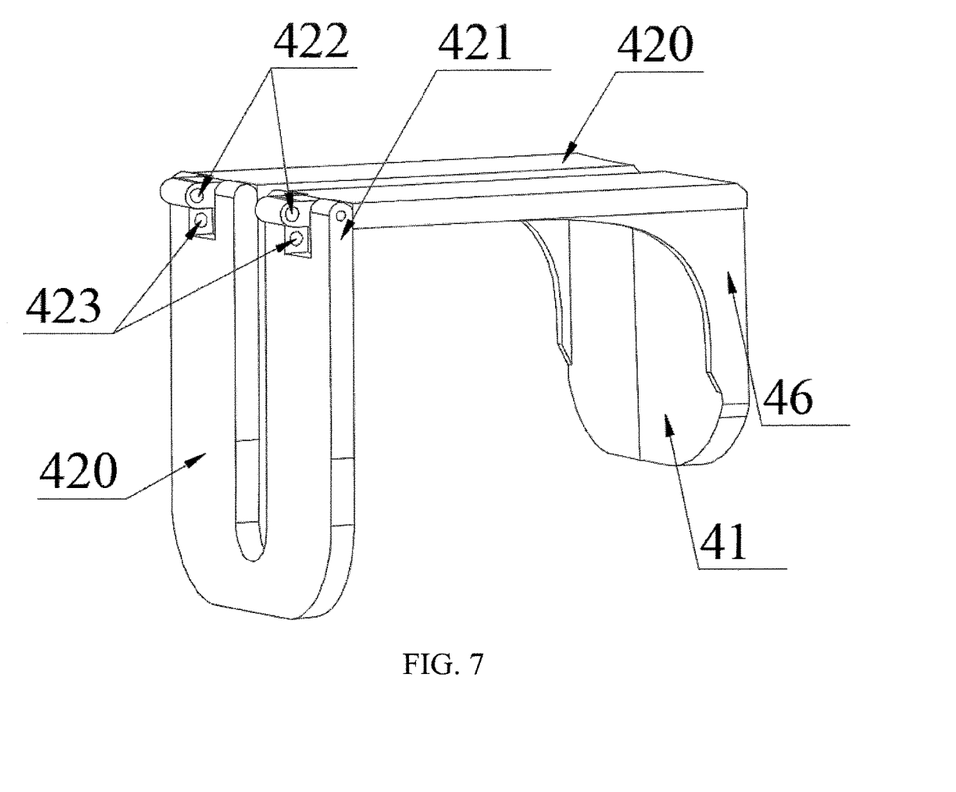
FIG. 7 is a diagram of another state of the rear support part of the Embodiment 3.

As shown in FIG. 5 to FIG. 7, a new-type antenna for a flat panel display TV includes a long strip shaped main body 1, wherein the front edge of the main body 1 is provided with a front support part 2 to be hung on a front edge of a top part of the flat panel display TV, the lower side of the main body is provided with a sliding locking mechanism 3 and a rear support part 4 to be supported on a back side of the flat panel display TV. The rear support part 4 is installed on the main body 1 through the slide locking mechanism 3 and can be adjusted forwards and backwards through the slide locking mechanism 3.

The rear support part 4 includes a rear support plate 41 and a sliding fixed plate 42, which are jointed at a certain angle and between which a ribbed plate 46 used for enhancing structural strength is arranged. A first sliding groove 43 extending forwards and backwards is mounted on the sliding fixed plate 42 in which the slide locking mechanism 3 used for adjusting the sliding fixed plate 42 forwards and backwards is installed. Further, the structure of the ribbed plate 46 is in the form of L of which two legs are connected by means of circular arc transition so as to avoid stress concentration and enhance the strength.

As shown in FIG. 6 and FIG. 7, a rotating mechanism 421 used for folding is arranged at the middle part of the sliding fixed plate 42. The rotating mechanism 421 divides the sliding fixed plate 42 into two sub plates 420. The two sub plates 420 are respectively provided with a lock part 422 and a catch part 423, which are buckled with each other, at the position of the rotating mechanism 421. Specifically, the lock part 422 extends outwards and is equipped with ball shaped projections at two sides thereof, while the catch part 423 is concaved inwards and is provided with ball shaped recesses accommodated with the ball shaped projections.

The sliding locking mechanism 3 includes a first bolt passing through the first sliding groove 43 and a first turncap fixed at the bottom end of the first bolt. Correspondingly, a screw hole matched with the first bolt is arranged on the lower side of the main body 1.

Figure 8:
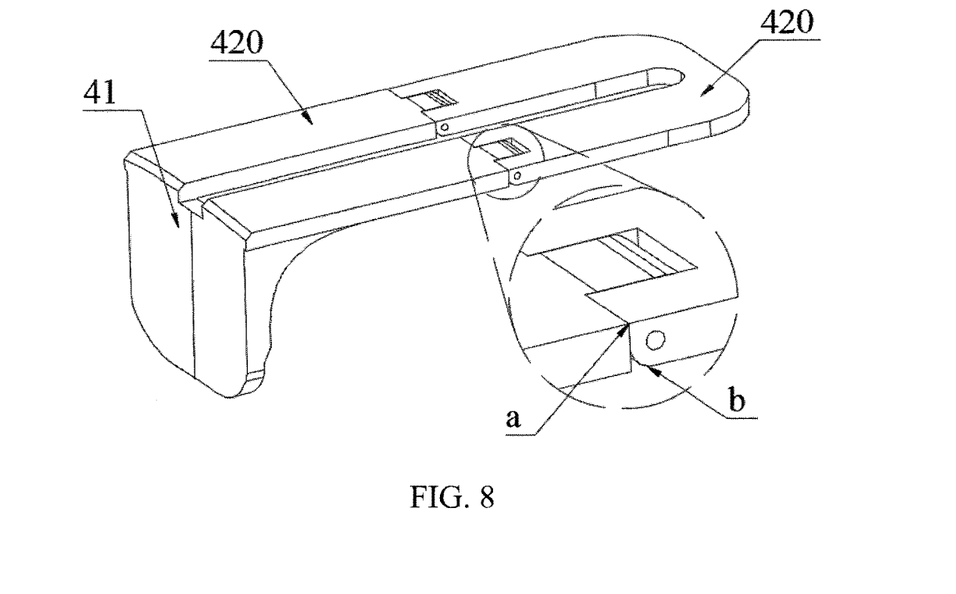
FIG. 8 is a diagram of another implementation of the rear support part of the Embodiment 3 according to the present invention.
Figure 9:
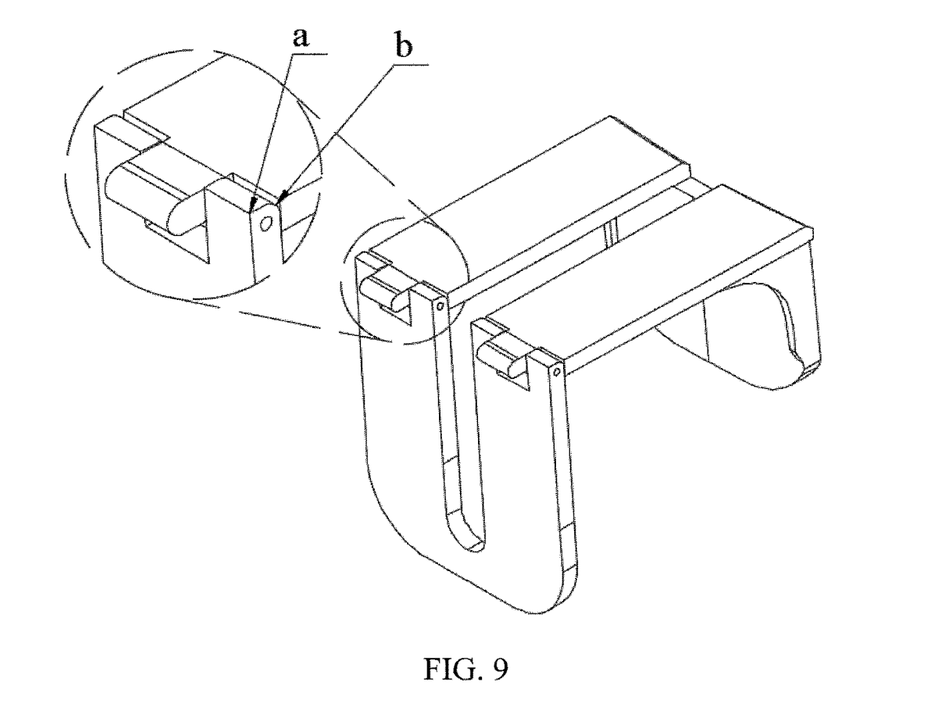
FIG. 9 is a diagram of another implementation of the rear support part of the Embodiment 3 according to the present invention.

Preferably, as the part a of the FIG. 8 and FIG. 9 shows, the upper sides of the two sub plates at the joint position lying against each other are both in the form of right angles, and the lower side of one of the sub plates at the joint position is in the form of a rounded angle as the part b of FIG. 8 and FIG. 9 shown. As a result, any one of the sub plates can be rotated downwards only, which can be clearly obtained from FIG. 9.

Embodiment 4

Figure 10:
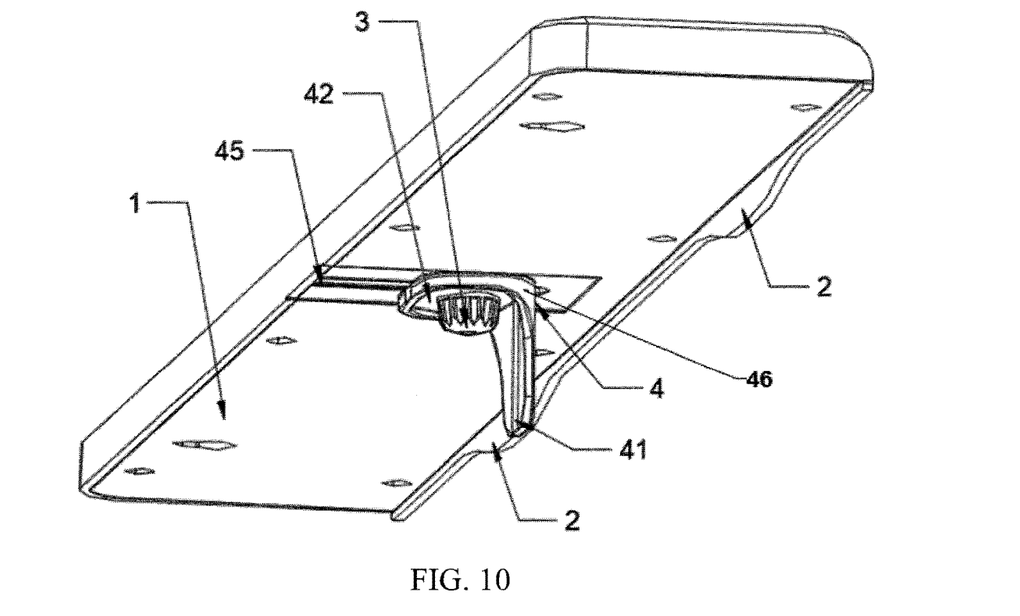
FIG. 10 is a diagram of Embodiment 4 according to the present invention.
Figure 11:
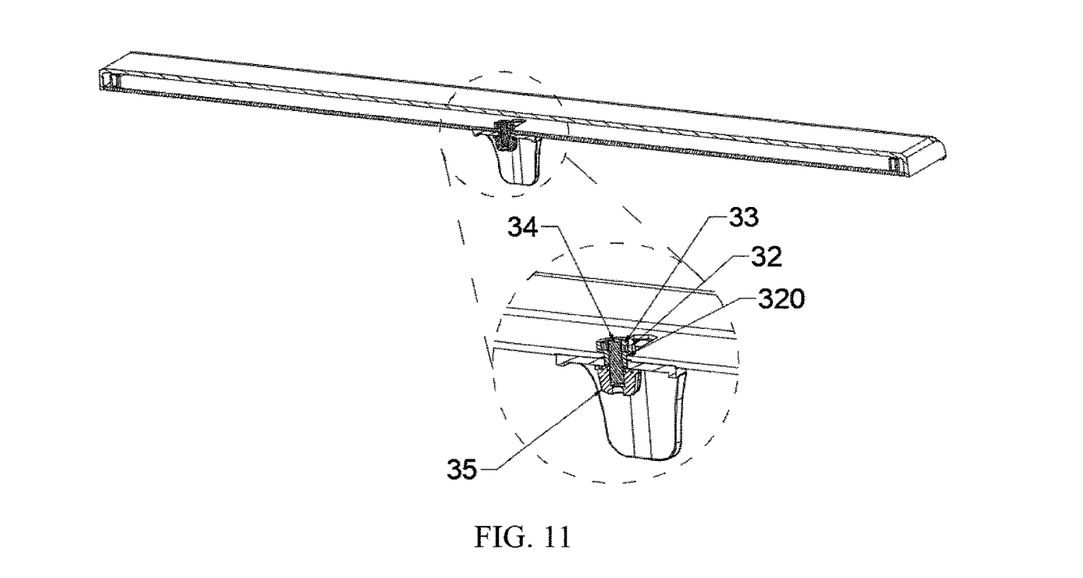
FIG. 11 and FIG. 12 are sectional views of the Embodiment 4 in two different directions according to the present invention.
Figure 12:
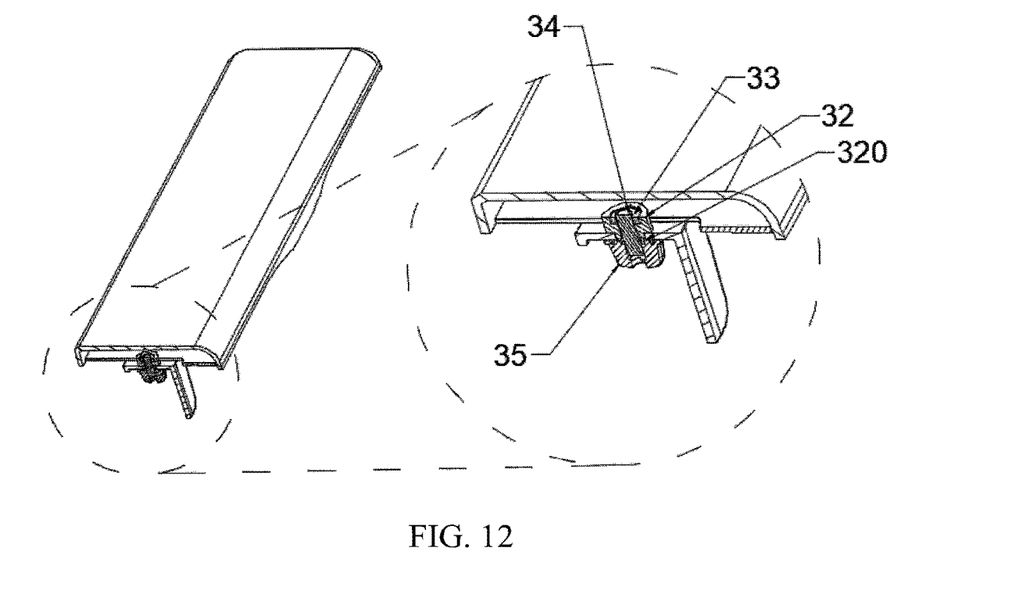

As shown in FIG. 10 to FIG. 12, a new-type antenna for a flat panel display TV includes a long strip shaped main body 1, wherein the front edge of the main body 1 is provided with a front support part 2 to be hung on a front edge of a top part of the flat panel display TV, and the lower side of the main body is provided with a slide locking mechanism 3 and a rear support part 4 to be supported on a back side of the flat panel display TV. The rear support part 4 is installed on the main body 1 through the slide locking mechanism 3 and the rear support part 4 can be adjusted forwards and backwards through the slide locking mechanism 3.

The rear support part 4 includes a rear support plate 41 and a sliding fixed plate 42, which are jointed at certain angle and between which a ribbed plate 46 used for enhancing structural strength is arranged. A first sliding groove 43 extending forwards and backwards is mounted on the sliding fixed plate 42 in which the sliding locking mechanism 3 used for adjusting the sliding fixed plate 42 forwards and backwards is installed. Further, the structure of the ribbed plate 46 is in the form of L of which two legs are connected by means of circular arc transition so as to avoid stress concentration and enhance the strength.

As shown in FIG. 11 and FIG. 12, the slide locking mechanism 3 includes: a cylindrical clamping part 32, two sides of which are provided with bayonets 320 lying against the two sides of the second sliding groove 45; a nut 33, which is fixed on the upper end of the clamping part 32; and a second bolt 34 passing through the centers of the cylindrical clamping part 32 and the nut 33, which is fixed with a second turncap 35 for rotation. The sliding fixed plate 42 is installed between the second turncap 35 and the main body 1.

Embodiment 5

Figure 13:
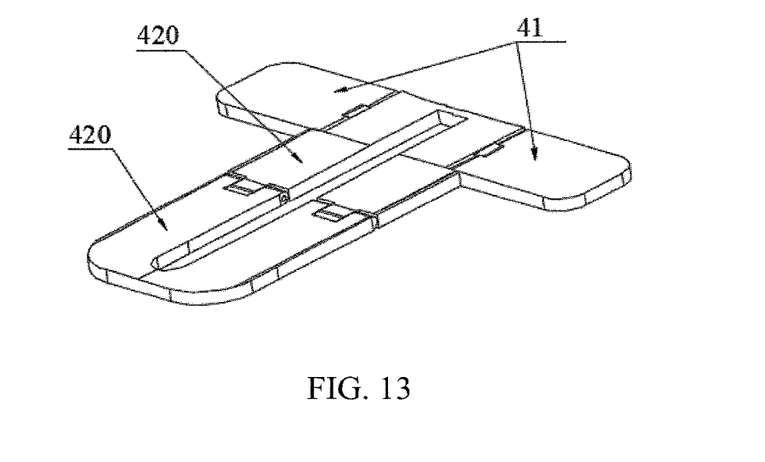
FIG. 13 and FIG. 14 are diagrams of Embodiment 5 according to the present invention.
Figure 14:
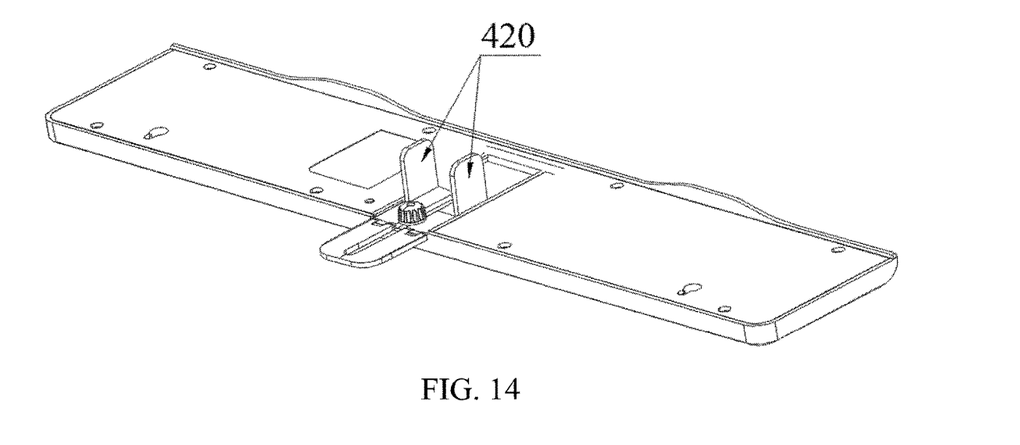

This embodiment differs from the Embodiment 3 in that, as shown in FIG. 13 and FIG. 14, the rear support plate 41 in this embodiment is hinged with the two sides of one of the sub plates 420, without a ribbed plate. During the storage or transportation process, the rear support plate 41 may be rotated to a position parallel with the sliding fixed plate 42 so that the occupied space is saved and both flexibility and convenience are achieved. When used, the rear support plate 41 is rotated to a position intersecting the sliding fixed plate 42.

During the specific implementation process, all the above embodiments are implemented as follows.

The height of the rear support plate 41 is 2 to 6 cm, preferably 2.5 to 5 cm; the front support part 2 includes the hanging plate extending downwards from the front edge of the main body, and the height of the hanging plate is 0.5 to 1.5 cm, preferably 0.5 to 1.0 cm; the angle formed between the hanging plate and the main body 1 is 90°; the width of the main body 1 is 5 to 10 cm, preferably 5 to 8 cm; and the length of the main body 1 is 25 to 80 cm, preferably 30 to 60 cm.

Installation methods for all the above embodiments may be concluded as follows. Buckling the hanging plate on the front edge of the top part of the flat panel display TV and adjusting the sliding fixed plate 42, according to the width of the flat panel display TV, to an appropriate position using the slide locking mechanism 3. As for the Embodiment 1, the first sliding groove 43 will move forwards and backwards with the forward and backward movement of the sliding fixed plate 42. During the movement process, the V shaped leaf spring 31 stretches and retracts continuously and the tip part thereof is clamped in different cogging of the sawtooth 44. As for the Embodiment 2, the first turncap may be turned to loosen the first bolt, then the sliding fixed plate 42 may be pushed, along the first sliding groove 43, to move forwards and backwards to an appropriate position, and finally the first bolt is screwed through the first turncap. As for the Embodiment 3, the second bolt 34 is loosened by turning the second turncap 35, then the cylindrical clamping piece 32 may be pushed along the second sliding groove 45, which moves the sliding fixed plate 42 to an appropriate position. In the above three different operating methods the rear support plate 41 is supported on the back side of the flat panel display TV.

The antenna is installed and used in such a manner that the sliding fixed plate 42 is arranged at the rear end and the rear support plate 41 is arranged at the front end. In particular, as for the embodiment 2, when the first turncap is screwed and fixed on the sub plate 420 at the front end of the sliding fixed plate 42, if the sub plate 420 at the rear end is blocked by a wall surface, the sub plate 420 at the rear end should be rotated downwards using the rotating mechanism 421; when the first turncap is screwed and fixed on the sub plate 420 at the rear end of the sliding fixed plate 42, the two sub plates 420 should be buckled together through the ball shaped projection of the lock part 422 and the ball shaped recess of the catch part 423 so as to avoid the situation that the sub plate 420 at the front end rotates downwards to hinder the installation and use. In the above installation methods, the rear support plate 41 is arranged at the front end, that is to say, the rear support plate 41 is closer to the hanging plate, which is more suitable for flat panel display TVs with smaller width.

Alternatively, the antenna is installed and used in such a manner that the sliding fixed plate 42 is arranged at the front end and the rear support plate 41 is arranged at the rear end. In particular, as for the embodiment 2, when the first turncap is screwed and fixed on the sub plate 420 at the front end of the sliding fixed plate 42, the two sub plates 420 should be buckled together through the ball shaped projection of the lock part 422 and the ball shaped recess of the catch part 423 so as to avoid the situation that the sub plate 420 at the rear end rotates downwards to cause the rear support plate 41 to rotates downwards and thus to hinder the installation and use.

When the back side of the flat panel display TV is a plane, in order to make the hanging plate and the rear support plate 41 to clamp the front and back sides of the flat panel display TV simultaneously and achieve good stability, the shortest distance between them will be adjusted, using the slide locking mechanism 3, to be equal to the width of the flat panel display TV. When the back side of the flat panel display TV is protruding at a certain angle, the distance between the hanging plate and the rear support plate 41 will be adjusted using the slide locking mechanism until that the rear end of the main body 1 is not higher than the front end of the main body 1 after the antenna is installed. In one aspect, by virtue of the gravity of the rear end of the main body 1 and the downward tension of the cable, the hanging plate at the front end of the main body 1 is tightly buckled on the front edge of the top part of the flat panel display TV. In another aspect, the proportion of the antenna in the front view of the flat panel display TV is reduced, so that the antenna does not seem protruding from the flat panel display TV and keeps beautiful and harmonious with the flat panel display TV.

The invention claimed is:

1. A new-type flat panel TV antenna, comprising a long strip shaped main body, wherein a front edge of the main body is provided with a front support part to be hung on a front edge of a top part of the flat panel display TV, a lower side of the main body is provided with a slide locking mechanism and a rear support part to be supported on a back side of the flat panel display TV, characterized in that: the rear support part is installed on the main body through the slide locking mechanism, and the rear support part is adjusted forwards and backwards through the slide locking mechanism.

2. The new-type flat panel TV antenna according to claim 1, characterized in that: the rear support part comprises a rear support plate and a sliding fixed plate, which are jointed at a certain angle; a first sliding groove extending forwards and backwards is opened on the sliding fixed plate in which the slide locking mechanism used for forwards and backwards adjusting the sliding fixed plate is installed; at least one side of the first sliding groove is provided with sawtooth; the slide locking mechanism is arranged on the lower side of the main body; and a V-shaped leaf spring or a pawl engaged with the cogging of the sawtooth is clamped on the slide locking mechanism.

3. The new-type flat panel TV antenna according to claim 2, characterized in that: a hanging hole is arranged on the rear support plate.

4. The new-type flat panel TV antenna according to claim 2, characterized in that: a rotating mechanism used for folding is arranged at the middle part of the sliding fixed plate which divides the sliding fixed plate into two sub plates; the two sub plates are respectively provided with a lock part and a catch part, which are buckled with each other, at the position of the rotating mechanism; the sliding locking mechanism comprises a first bolt passing through the first sliding groove and a first turncap fixed at the bottom end of the first bolt; correspondingly, a threaded hole matched with the first bolt is opened on the lower side of the main body.

5. The new-type flat panel TV antenna according to claim 2, characterized in that: a rotating mechanism used for folding is arranged at the middle part of the sliding fixed plate which divides the sliding fixed plate into two sub plates and a guide groove extending forwards and backwards is arranged on the lower side of the main body in which the two sub plates are clamped for moving forwards and backwards.

6. The new-type flat panel TV antenna according to claim 4, characterized in that: the two sub plates are respectively provided with a projection and a recess, which can be buckled with each other, at the joint position.

7. The new-type flat panel TV antenna according to claim 4, characterized in that: upper sides of the two sub plates at the joint position lying against are both in the form of right angles and the lower side of one of the sub plates at the joint position is in the form of rounded angle so that any one of the sub plates can be rotated downwards only.

8. The new-type flat panel TV antenna according to claim 5, characterized in that: upper sides of the two sub plates at the joint position lying against are both in the form of right angles and the lower side of one of the sub plates at the joint position is in the form of rounded angle so that any one of the sub plates can be rotated downwards only.

9. The new-type flat panel TV antenna according to claim 6, characterized in that: upper sides of the two sub plates at the joint position lying against are both in the form of right angles and the lower side of one of the sub plates at the joint position is in the form of rounded angle so that any one of the sub plates can be rotated downwards only.

10. The new-type flat panel TV antenna according to claim 1, characterized in that: the rear support part comprises a rear support plate and a sliding fixed plate, which are jointed at a certain angle; the sliding fixed plate and the slide locking mechanism are installed and matched with each other; a second sliding groove extending forwards and backwards is mounted on the lower side of the main body in which the slide locking mechanism used for adjusting the sliding fixed plate forwards and backwards is installed.

11. An installation method for flat panel TV antenna according to claim 2, characterized in that the method comprises: buckling the front support part on the front edge of the top part of the flat panel display TV and adjusting, according to a width of the flat panel display TV, the sliding fixed plate to an appropriate position using the slide locking mechanism, so that the rear support plate is supported on the back side of the flat panel display TV.

12. An installation method for flat panel TV antenna according to claim 3, characterized in that the method comprises: buckling the front support part on the front edge of the top part of the flat panel display TV and adjusting, according to a width of the flat panel display TV, the sliding fixed plate to an appropriate position using the slide locking mechanism, so that the rear support plate is supported on the back side of the flat panel display TV.

13. An installation method for flat panel TV antenna according to claim 4, characterized in that the method comprises: buckling the front support part on the front edge of the top part of the flat panel display TV and adjusting, according to a width of the flat panel display TV, the sliding fixed plate to an appropriate position using the slide locking mechanism, so that the rear support plate is supported on the back side of the flat panel display TV.

14. An installation method for flat panel TV antenna according to claim 5, characterized in that the method comprises: buckling the front support part on the front edge of the top part of the flat panel display TV and adjusting, according to a width of the flat panel display TV, the sliding fixed plate to an appropriate position using the slide locking mechanism, so that the rear support plate is supported on the back side of the flat panel display TV.

15. An installation method for flat panel TV antenna according to claim 6, characterized in that the method comprises: buckling the front support part on the front edge of the top part of the flat panel display TV and adjusting, according to a width of the flat panel display TV, the sliding fixed plate to an appropriate position using the slide locking mechanism, so that the rear support plate is supported on the back side of the flat panel display TV.

16. The installation method according to claim 11, characterized in that: the antenna is installed and used in such a manner that the sliding fixed plate is arranged at the rear end and the rear support plate is arranged at the front end, or that the sliding fixed plate is arranged at the front end and the rear support plate is arranged at the rear end.

17. The installation method according to claim 11, characterized in that: when the back side of the flat panel display TV is a plane, the shortest distance between the front support part and the rear support plate will be adjusted, using the slide locking mechanism, to be equal to the width of the flat panel display TV; and, when the back side of the flat panel display TV is protruding at a certain angle, the distance between the front support part and the rear support plate is adjusted using the slide locking mechanism until that the rear end of the main body is not higher than the front end of the main body after the installation of the antenna.

\* \* \* \* \*